(12) United States Patent
Liao

(10) Patent No.: US 7,236,314 B2
(45) Date of Patent: Jun. 26, 2007

(54) COMPACT LENS SYSTEM

(75) Inventor: Chen-cheng Liao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 15 days.

(21) Appl. No.: 11/183,790

(22) Filed: Jul. 19, 2005

(65) Prior Publication Data

US 2006/0061881 A1   Mar. 23, 2006

(30) Foreign Application Priority Data

Sep. 23, 2004   (TW) .............................. 93128907 A

(51) Int. Cl.
*G02B 9/12* (2006.01)
*G02B 9/14* (2006.01)
*G02B 9/00* (2006.01)
*G02B 3/02* (2006.01)

(52) U.S. Cl. ...................... 359/784; 359/785; 359/790; 359/740; 359/708

(58) Field of Classification Search ................ 359/784, 359/785, 790, 708, 716, 689, 690, 738–740
See application file for complete search history.

(56) References Cited

U.S. PATENT DOCUMENTS

| 4,212,517 | A   | 7/1980  | Fujii |
|-----------|-----|---------|-------|
| 4,364,643 | A   | 12/1982 | Momiyama |
| 4,390,252 | A   | 6/1983  | Mori |
| 4,396,255 | A   | 8/1983  | Imai |
| 4,426,137 | A   | 1/1984  | Mori |
| 4,443,070 | A   | 4/1984  | Fujioka |
| 4,448,497 | A   | 5/1984  | Wakamiya |
| 6,441,971 | B2  | 8/2002  | Ning |
| 6,927,925 | B2* | 8/2005  | Amanai ...................... 359/740 |
| 6,992,841 | B2* | 1/2006  | Saito et al. ................. 359/794 |

* cited by examiner

*Primary Examiner*—Scott J. Sugarman
*Assistant Examiner*—Jack Dinh
(74) *Attorney, Agent, or Firm*—Troxell Law Office, PLLC

(57) ABSTRACT

A compact lens system includes, in succession from an object side to an image side, an aspheric first lens element (1) having a positive power, an aperture stop (4), an aspheric second lens element (2) having a negative power, and a third lens element (3) having a positive power. Both the first and second lens elements are meniscus lenses made of plastic, and the third lens element is a biconvex lens or a plano-convex lens made of glass. The first lens element has a convex surface (10) facing the object side and an opposite concave surface (11) facing the aperture stop. The second lens element has a concave surface (21) facing the aperture stop and an opposite convex surface (20) curved toward the image side. The surface (30) of the third lens element facing toward the image side has a radius of curvature larger than that of the other surface (31) facing the second lens element.

10 Claims, 10 Drawing Sheets

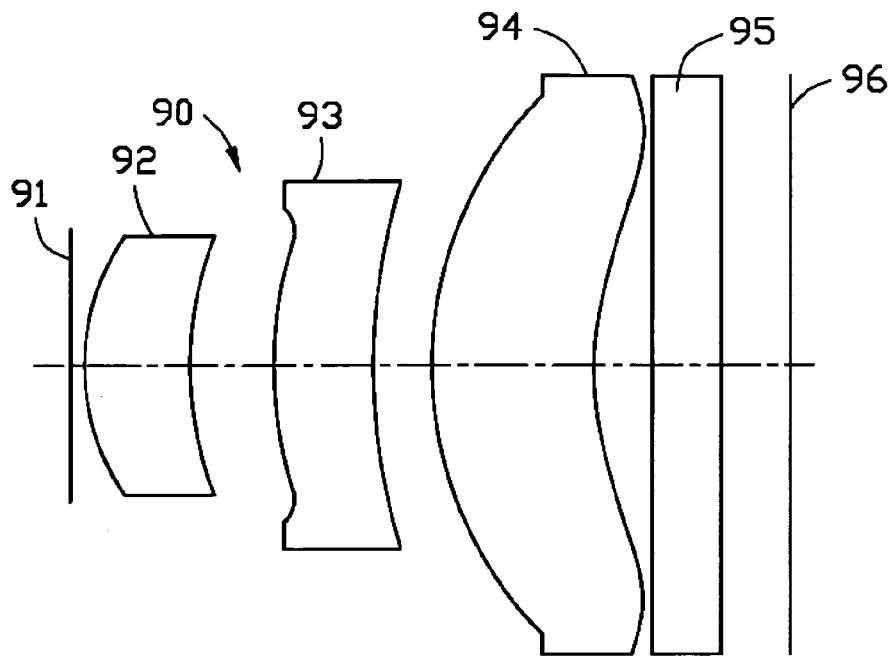
FIG. 1 *(Prior Art)*
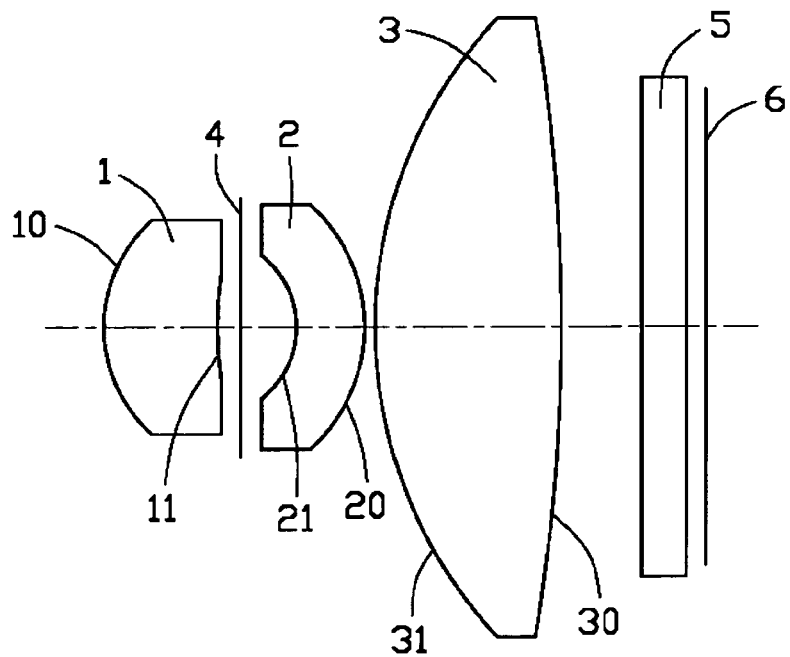
FIG. 2

COMPACT LENS SYSTEM

BACKGROUND OF THE INVENTION

1. Field of the Invention

The present invention relates to a lens system, and particularly relates to a compact lens system for use in a compact photographic apparatus such as a camera phone and a compact digital camera.

2. Description of Prior Art

In the optical art, spherical lenses are widely used to facilitate manufacture and increase yield. However, spherical lenses have the inherent problems of optical aberrations such as spherical aberration and chromatic aberration. Accordingly, conventional lens systems are generally composed of several spherical lens elements to balance these inherent optical aberrations. However, where all lens elements have spherical surfaces, a high number of lens elements is generally required, thereby making the lens system long, heavy, and expensive to manufacture. This deviates from the current trend for compact photographic apparatus requiring a corresponding compact lens system having a very short overall length from the frontmost lens surface to the image plane.

Accordingly, aspheric lenses are introduced to help reduce aberrations. The inclusion of aspheric lens elements in a lens system enables reduction of the amount of lens elements in the system, which makes the lens system smaller and lighter.

Spherical or aspheric lenses may be made of plastic or glass. In comparison to plastic, glass has higher transmissivity, better performance, but higher cost, and thus is suitable for high-end applications. In contrast, plastic has lower transmissivity, lighter weight and lower cost, and thus is suitable for low-end applications. In some applications, a glass and plastic hybrid lens is employed for reducing the overall weight while maintaining relatively high performance.

In the current market, most lens systems for camera phones are generally composed of two plastic lens elements, or of one glass lens element and two plastic lens elements. The lens system of two plastic lens elements has low optical performance and requires a high level of precision, which limits its extensive application. The lens system of one glass lens element and two plastic lens elements is disclosed in U.S. Pat. No. 6,441,971. As shown in FIG. 1, the lens system 90 disclosed in the '971 patent includes, from the object side thereof, an aperture stop 91, a distal meniscus lens element 92 made of glass, first and second aberration correcting lens elements 93, 94 made of plastic, a cover glass 95 and an image plane 96. The meniscus lens element 92 has a convex surface facing the object side, and is adapted to reduce lens temperature sensitivity and provide most of the focusing power while the lens elements 93, 94 provide aberration compensation. The lens elements 93, 94 are both aspheric to reduce the overall length of the lens system 90. However, the aspheric lens elements 93, 94 are asymmetrically arranged. As a result, distortions of the optical system 90 cannot be eliminated completely. Furthermore, since most of the focusing power of the optical system is provided by the meniscus lens element 92, the meniscus lens element 92 must be formed with a large curvature, which makes manufacture difficult especially when the aperture of the meniscus lens element 92 is small.

U.S. Pat. No. 4,212,517 discloses a lens system of a modified Gauss type having the aperture stop between lens elements. This symmetry design of the lens elements allows well-balanced correction of all types of aberrations. However, this lens system is composed of six lenses. Consequently, the overall length of this lens system is increased, which deviates from the current trend for compactness. Various symmetry arrangements of lens elements are also disclosed in U.S. Pat. Nos. 4,364,643; 4,390,252; 4,396,255; 4,426,137; 4,443,070 and 4,44,8497. However, these lens systems as disclosed also have the same problem of a large number of lens elements, and thus are not suitable for use in compact photographic devices.

SUMMARY OF THE INVENTION

Accordingly, one object of the present invention is to provide a compact lens system that has a reduced number of component lenses to significantly reduce the overall length thereof.

Another object of the present invention is to provide a compact lens system that can be easily manufactured at a low cost while offering a high level of optical performance.

To achieve the above objects of the present invention, a compact lens system in accordance with the present invention includes, in succession from an object side to an image side thereof, a positive first lens element, an aperture stop, a negative second lens element and a third positive lens element. The first lens element has a convex surface facing the object side and an opposite concave surface facing the aperture stop. The second lens element has a concave surface facing the aperture stop and an opposite convex surface curved toward the image side. The surface of the third lens element facing toward the image side has a radius of curvature larger than that of the other surface facing the second lens element.

Both the first and second lens elements are meniscus lenses made of plastic. The third lens element is a biconvex lens or a plano-convex lens made of glass.

Both the first and second lens elements are aspheric lenses having aspheric surfaces expressed by the following equation:

$$z = \frac{ch^2}{1 + [1 - (k+1)c^2h^2]^{1/2}} + Ah^4 + Bh^6 + Ch^8 + Dh^{10} + Eh^{12}$$

where, z represents a sag amount which is defined as a distance from a point on the aspheric surface to a plane tangential to the aspheric surface at the optical axis; $c=1/r$, r is the paraxial radius of curvature; h represents a height of a point on the aspheric surface with respect to the optical axis; k represents a cone constant; and A, B, C, D and E are the $4^{th}$-order, $6^{th}$-order, $8^{th}$-order, $10^{th}$-order and $12^{th}$-order aspheric coefficients, respectively.

The first, second and third elements satisfy the following conditions:

$1.5 < -f2/f1 < 3.5$ $1.2 < f3/f1 < 1.8$ $1.73 < nd < 1.84$ $42 < vd < 55$ where, f1, f2 and f3 are focal lengths of the first, second and third lens elements, respectively; nd is the refractive index of the third lens element; and vd is the Abbe number of the third lens element.

BRIEF DESCRIPTION OF THE DRAWINGS

The present invention may best be understood through the following description with reference to the accompanying drawings, in which:

FIG. 1 is an optical cross-sectional view of a conventional compact lens system;

FIG. 2 is an optical cross-sectional view of a compact lens system in accordance with the present invention;

DETAILED DESCRIPTION OF THE INVENTION

Figure 3A:
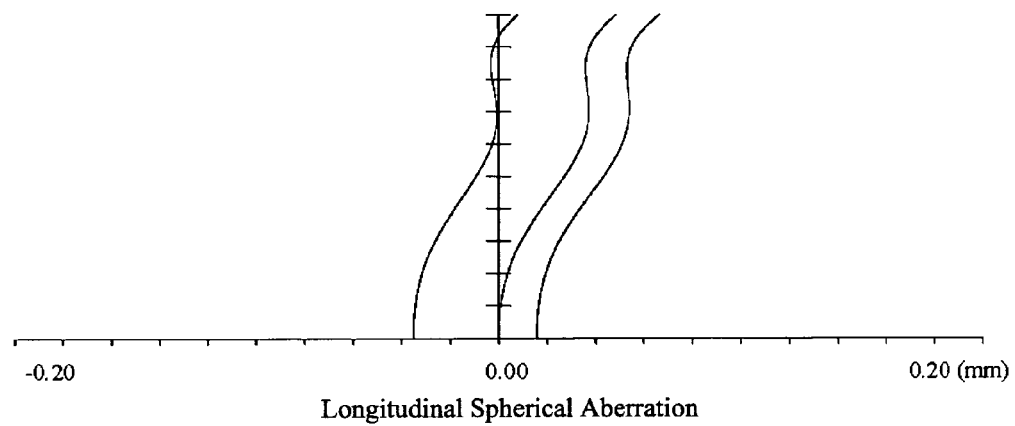
FIGS. 3A-3D respectively show graphs of longitudinal spherical aberration, field curvature, field distortion and transverse ray fan plots of the present compact lens system according to Numerical Embodiment 1.

FIG. 2 is an optical cross-sectional view of a compact lens system in accordance with the present invention. The present compact lens system includes an aperture stop 4, a positive first lens element 1 located on one side of the aperture stop 4 and facing an object side, a negative second lens element 2 located on the other side of the aperture stop 4, a positive third lens element 3, a cover glass 5 and an image plane 6. Both the positive first lens element 1 and the negative second lens element 2 are aspheric meniscus lenses made of plastic. Each of the first and second lens elements 1, 2 has a convex surface 10, 20 and an opposite concave surface 11, 21. The convex surface 10 of the first lens element 1 faces the object side, and the convex surface 20 of the second lens element 2 is curved toward an image side. The concave surfaces 11, 21 of the first and second lens elements 1, 2 are arranged on opposite sides of the aperture stop 4 facing each other. The third lens element 3 is a positive biconvex lens made of glass. Alternatively, the third lens element 3 may also be formed as a plano-convex lens. The surface 30 of the third lens element 3 facing toward the image side has a radius of curvature larger than that of the other surface 31 facing the second lens element 2. The aperture stop 4 is arranged between the first and second lens elements 1, 2 for light intensity adjustment.

The cover glass 5 is disposed between the positive third lens element 3 and the image plane 6, and may be coated with an optical film, such as an antireflective film or an IR (infrared) filtering film, to improve the image quality.

The first and second lens elements 1, 2 are arranged on opposite sides of the aperture stop 4, providing a degree of lens symmetry about the aperture stop 4. This variation of the Gauss type lens facilitates correction of lateral aberrations, and also facilitates mass production since a high level of precision is not required. Further, both the first and second lens elements 1, 2 are formed as aspheric lenses each with at least one surface thereof being an aspheric surface. By configuring the two lenses as aspheric lenses, the lens count is significantly reduced, thereby reducing the overall length of the present lens system.

The positive third lens element 3 is made of glass to facilitate manufacture. The surface 30 of the third lens element 3 facing toward the image side, which has a radius of curvature larger than that of the other surface 31 facing the second lens element 2, is suitable for being coated with an IR filtering film to reduce color shift.

In the embodiments of the present invention, the ratio of the focal length f2 of the second lens element 2 to the focal length f1 of the first lens element 1 satisfies the following condition:

$$1.5 < -f2/f1 < 3.5 \quad (1)$$

The third lens element 3 may be a biconvex or a plano-convex glass lens with a large aperture, and thus may be mass-produced by grinding a plurality of lenses at one time. The refractive index nd of the third lens element 3 satisfies the following condition:

$$1.73 < nd < 1.84 \quad (2)$$

The Abbe number vd of the third lens element 3 satisfies the following condition:

$$42 < vd < 55 \quad (3)$$

The focal length f3 of the third lens element 3 to the focal length f1 of the first lens element 1 satisfies the following condition:

$$1.2 < f3/f1 < 1.8 \quad (4)$$

The first and second lens elements 1, 2 are substantially symmetrically arranged with respect to the aperture stop 4 along the optical axis of the lens system. Preferably, all the convex surfaces 10, 20 and concave surfaces 11, 21 of the first and second lens elements 1, 2 are formed as aspheric surfaces to effectively eliminate aberrations. The overall length of the present lens system is significantly shortened and the production cost of the present lens system is thus reduced.

The aspheric surfaces of the first and second lens elements 1, 2 are expressed by the following equation:

$$z = \frac{ch^2}{1 + [1 - (k+1)c^2h^2]^{1/2}} + Ah^4 + Bh^6 + Ch^8 + Dh^{10} + Eh^{12}$$

where, z represents a sag amount which is defined as a distance from a point on the aspheric surface to a plane tangential to the aspheric surface at the optical axis; $c = 1/r$, r is the paraxial radius of curvature; h represents a height of a point on the aspheric surface with respect to the optical axis; k represents a cone constant; and A, B, C, D and E are the $4^{th}$-order, $6^{th}$-order, $8^{th}$-order, $10^{th}$-order and $12^{th}$-order aspheric coefficients, respectively.

The present invention will be more fully understood by describing three embodiments as follows.

The numerical data of Numerical Embodiments 1, 2 and 3 of the present lens system will be given below. In each numerical embodiment, i (i=1-6) indicates the order of the surface from the object side (the convex surface 10 of the first lens element 1, the concave surface 11 of the first lens element 1, the concave surface 21 of the second lens element 2, the convex surface 20 of the second lens element 2, the surface 31 of the third lens element 3 and the surface 30 of the third lens element 3, in succession). Ri indicates the radius of curvature of the ith surface, Ti indicates the distance between the ith surface and the (i+1)th surface, and Nd and Vd indicate the refractive index and the Abbe number of the ith member, respectively.

| Numerical Embodiment 1 | | | | | |
| --- | --- | --- | --- | --- | --- |
| Surface (i) | Ri (mm) | Ti (mm) | Nd | Vd | Conic |
| 1 | 1.254371 | 1.0 | 1.5435 | 56.8 | −1 |
| 2 | 2.891737 | 0.7 | | | −25.70336 |
| 3 | −0.8398514 | 0.6 | 1.5854 | 30.0 | 0.4515092 |
| 4 | −1.422601 | 0.1 | | | −0.531608 |
| 5 | 4.534197 | 1.65 | 1.8160 | 46.6 | 0 |
| 6 | −67.19731 | | | | 0 |

Aspheric coefficients for the aspheric surfaces 10, 11, 21 and 20 of the first and second lens elements 1, 2 are:

| | Coef. | | | | |
|---|---|---|---|---|---|
| Surface (i) | A | B | C | D | E |
| 1 | 0.057412443 | 0.090357481 | −0.16258233 | 0.18935324 | −0.070949038 |
| 2 | 0.11765694 | 0.71733489 | −8.6683466 | 35.231229 | −51.309397 |
| 3 | 0.018596367 | −0.0070811228 | 1.8135152 | −3.0730054 | 0 |
| 4 | −0.0044394887 | −0.052206289 | 0.13607374 | −0.10480404 | 0.014336758 |

According to the above numerical data of Numerical Embodiment 1, the ratio of −f2 to f1 is 1.657, nd is 1.8160, vd is 46.6, and the ratio of f3 to f1 is 1.568. The total focal length of the present lens system is 3.88 mm, the maximum image height is 2.3 mm, and the F-number is 3.3. The F-number is the ratio of the system's effective focal length to the diameter of the entrance pupil. In this Numerical Embodiment 1, the third lens element 3 is formed as a biconvex lens.

Figure 3B:
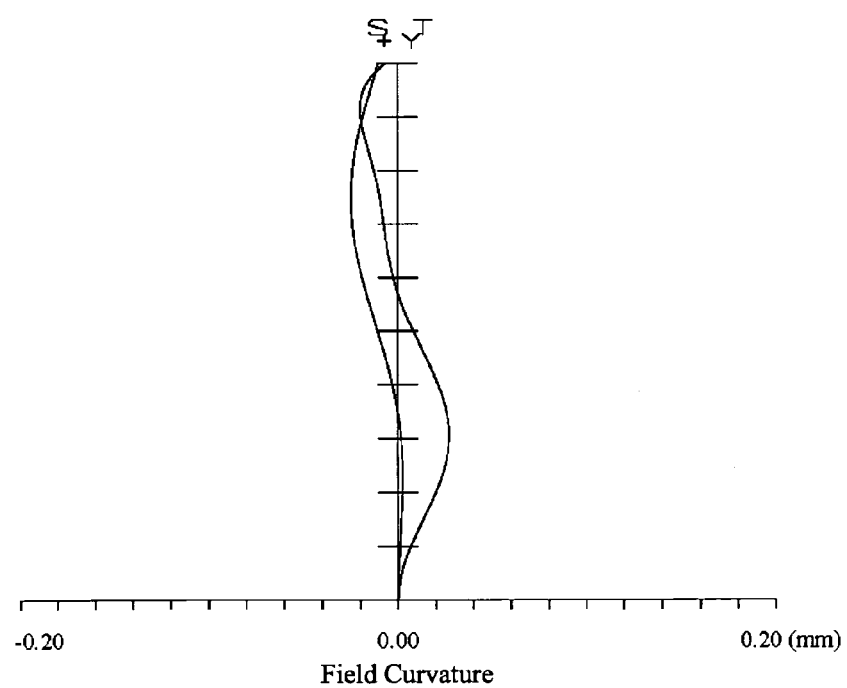
Figure 3C:
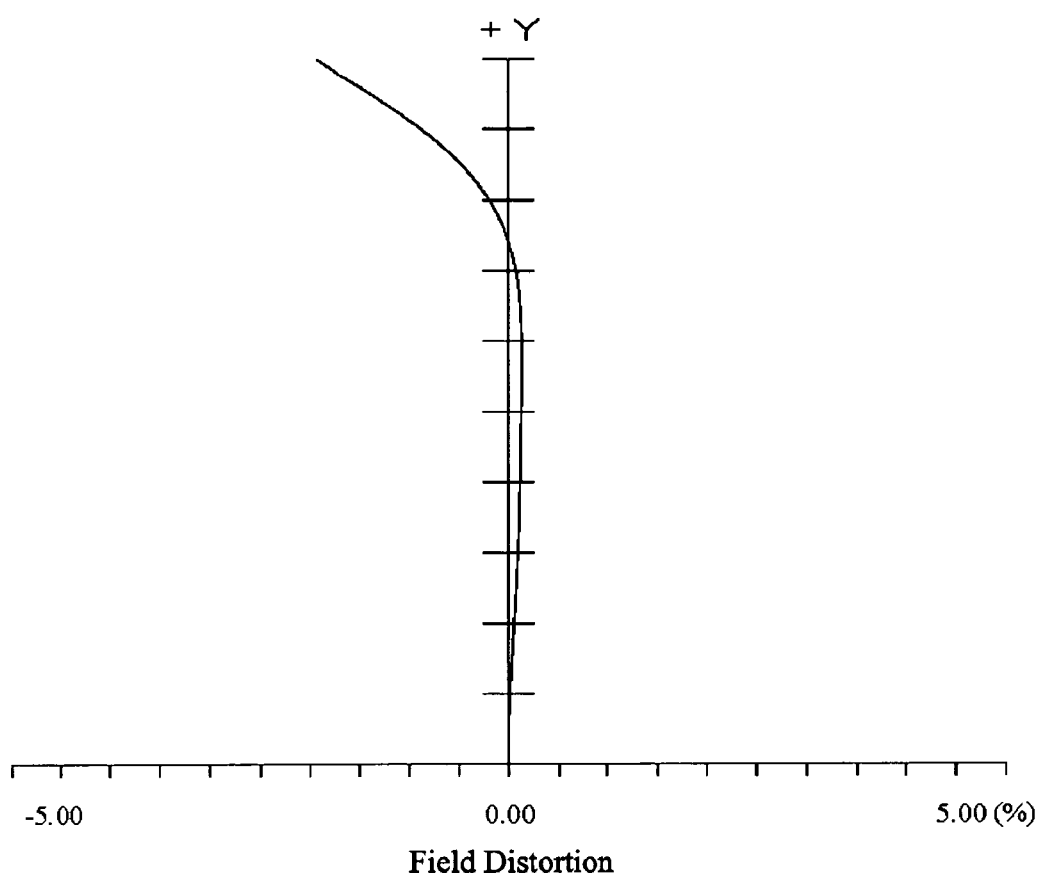
Figure 3D:
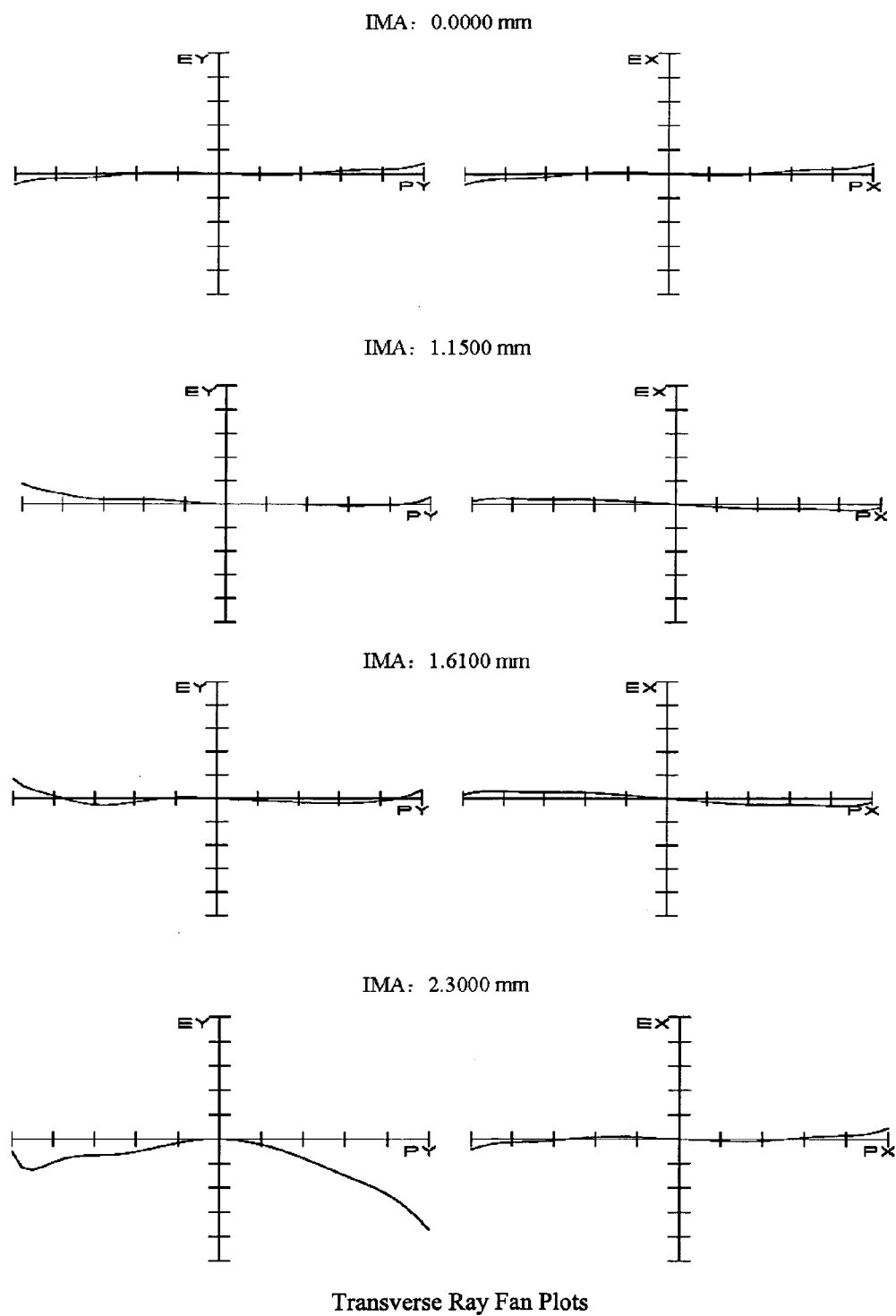

FIGS. 3A-3D respectively show graphs of longitudinal spherical aberration, field curvature, field distortion and transverse ray fan plots of the present compact lens system according to Numerical Embodiment 1. The graph of longitudinal spherical aberration shown in FIG. 3A is obtained in the case of a pupil radius of 0.6080 mm. The three curves in the graph from the left to the right are respectively obtained for the incident light of wavelengths 0.486 μm, 0.588 μm and 0.656 μm. The graphs illustrated in FIGS. 3B-3D are all obtained for the incident light of wavelength 0.588 μm. FIG. 3D illustrates the transverse ray fan plots of the present compact lens system when the image height is 0.000 mm, 1.1500 mm, 1.6100 mm and 2.3000 mm. It can be seen from these graphs that the present compact lens system of Numerical Embodiment 1 provides effective correction of various aberrations and thus a high level of optical performance is achieved.

According to the above numerical data of Numerical Embodiment 2, the ratio of −f2 to f1 is 3.014, nd is 1.7725, vd is 49.6 and the ratio of f3 to f1 is 1.553. The total focal length of the present lens system is 3.88 mm, the maximum image height is 2.3 mm, and the F-number is 2.84. In this Numerical Embodiment 2, the third lens element 3 is formed as a plano-convex lens.

Figure 4A:
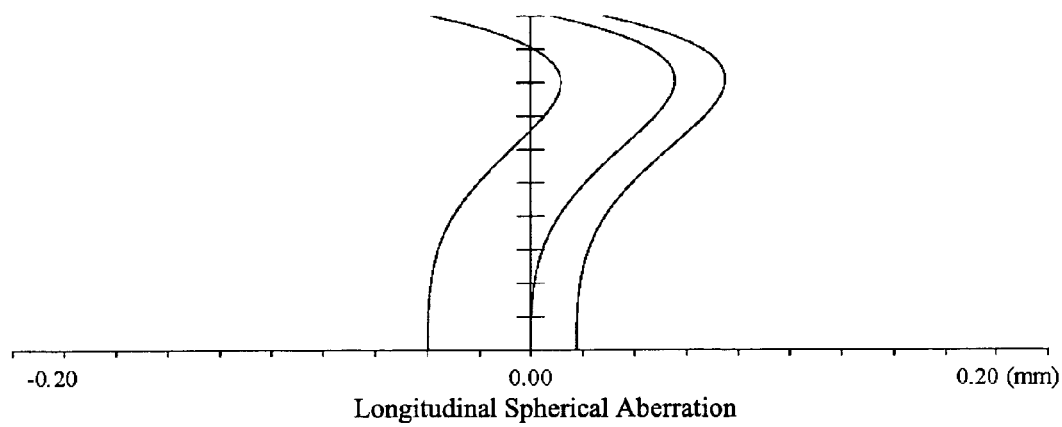
FIGS. 4A-4D respectively show graphs of longitudinal spherical aberration, field curvature, field distortion and transverse ray fan plots of the present compact lens system according to Numerical Embodiment 2.
Figure 4B:
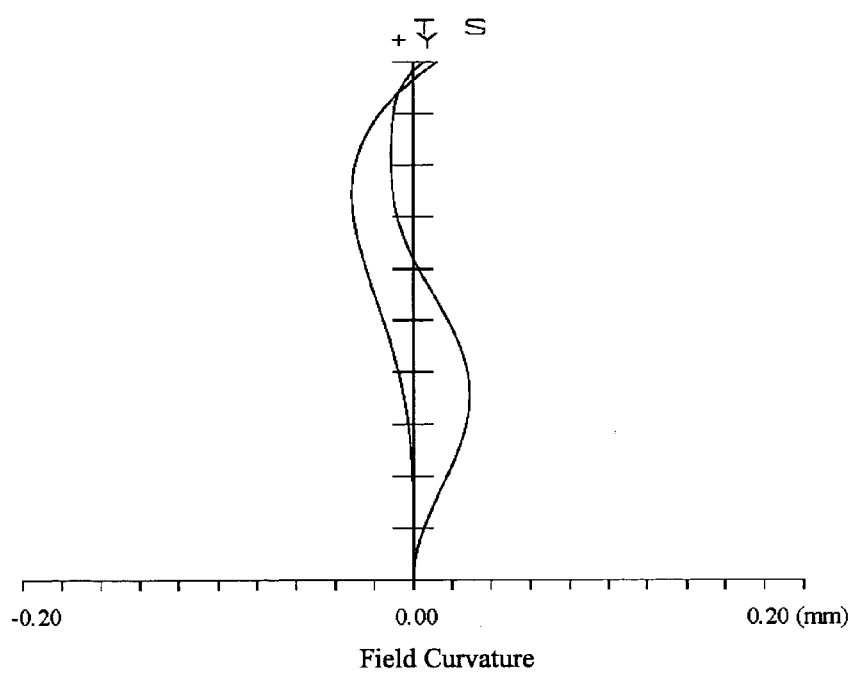
Figure 4C:
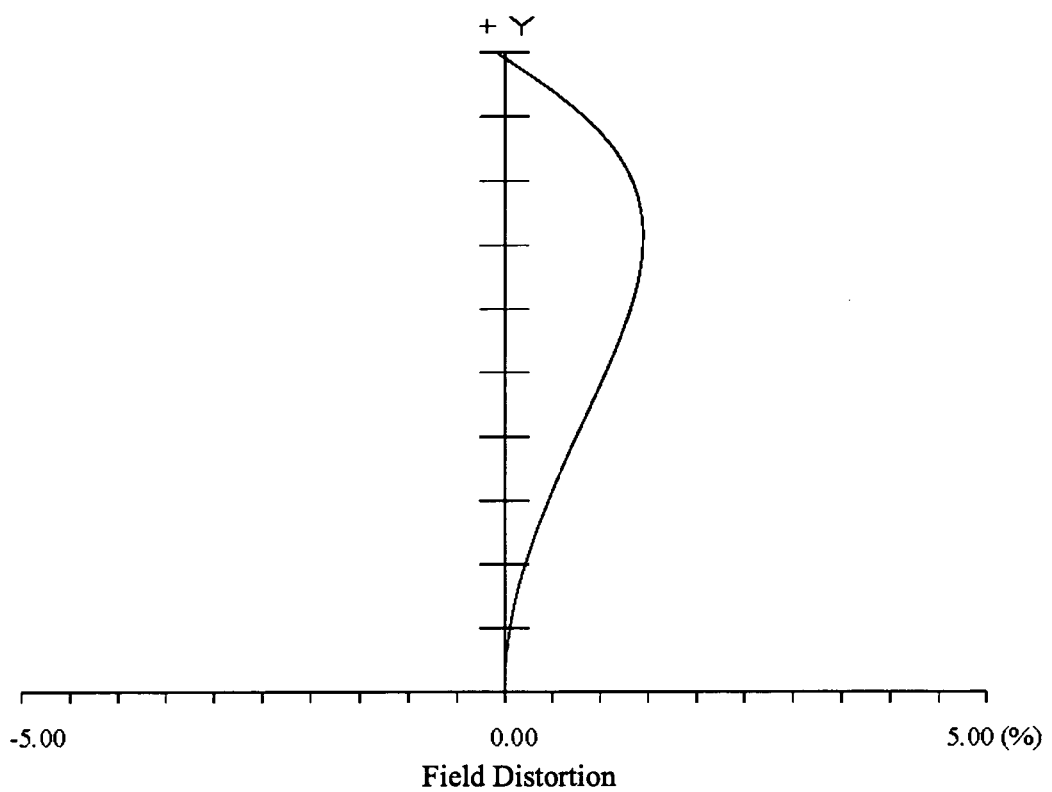
Figure 4D:
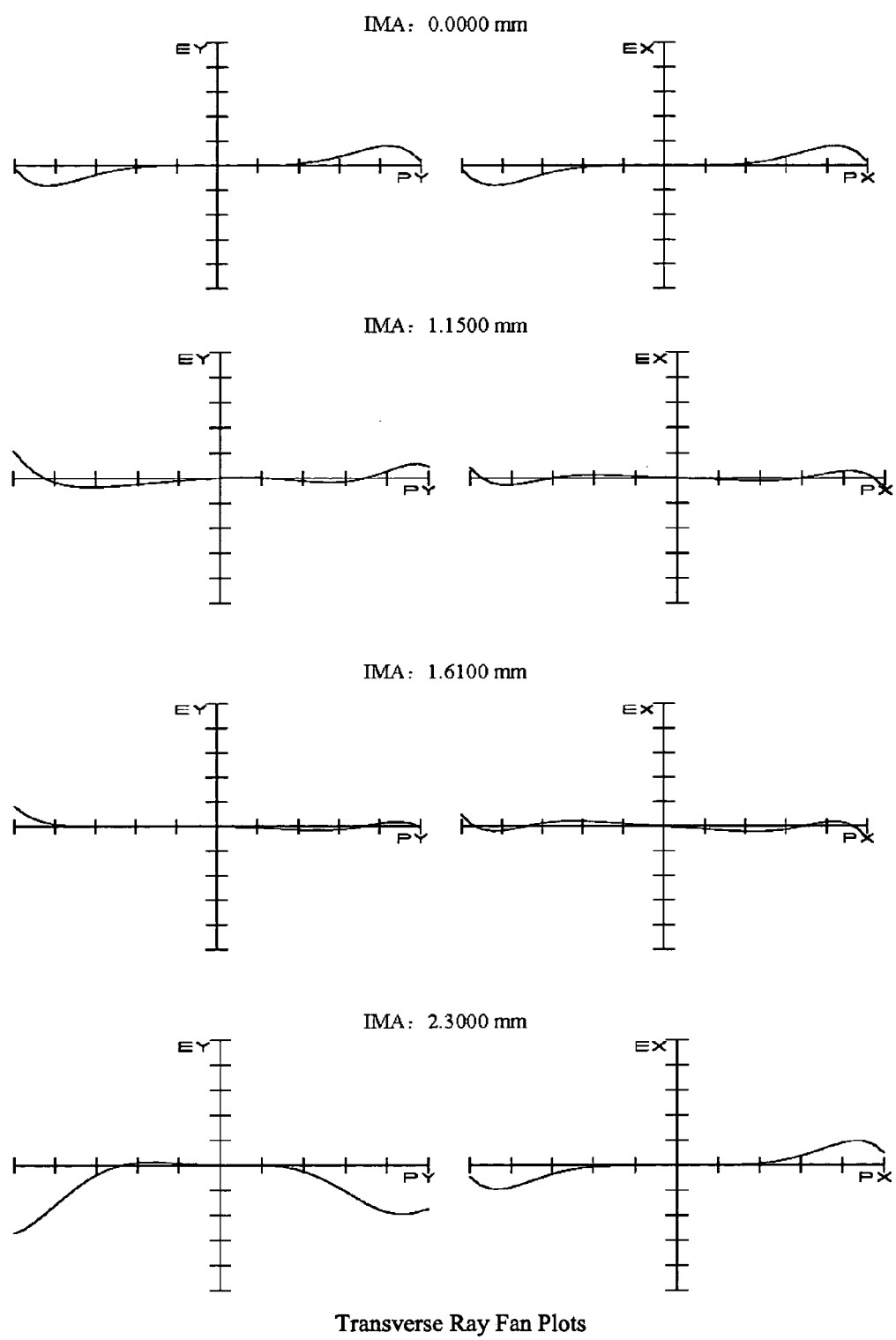

FIGS. 4A-4D respectively show graphs of longitudinal spherical aberration, field curvature, field distortion and transverse ray fan plots of the present compact lens system according to Numerical Embodiment 2. The graph of longitudinal spherical aberration shown in FIG. 4A is obtained in the case of a pupil radius of 0.6937 mm. The three curves in the graph from the left to the right are respectively obtained for the incident light of wavelengths 0.486 μm, 0.588 μm and 0.656 μm. The graphs illustrated in FIGS. 4B-4D are all obtained for the incident light of wavelength 0.588 μm. FIG. 4D illustrates the transverse ray fan plots of the present compact lens system when the image height is 0.000 mm, 500 mm, 1.6100 mm and 2.3000 mm. It can be seen that the present compact lens system of Numerical Embodiment 2 provides effective correction of various aberrations and thus a high level of optical performance is achieved.

| Numerical Embodiment 2 | | | | | |
|---|---|---|---|---|---|
| Surface (i) | Ri (mm) | Ti (mm) | Nd | Vd | Conic |
| 1 | 1.302729 | 1 | 1.5435 | 56.8 | −1 |
| 2 | 2.455596 | 0.7 | | | −2.688061 |
| 3 | −0.9016507 | 0.6 | 1.5854 | 30.0 | 0.462812 |
| 4 | −1.292029 | 0.15 | | | 0.1123836 |
| 5 | 4.69296 | 1.087694 | 1.7725 | 49.6 | 0 |
| 6 | Infinite | | | | 0 |

Aspheric coefficients for the aspheric surfaces 10, 11, 21 and 20 of the first and second lens elements 1, 2 are:

| | Coef. | | | | |
|---|---|---|---|---|---|
| Surface (i) | A | B | C | D | E |
| 1 | 0.071601115 | 0.0098254298 | 0.030663971 | 0.0057634682 | 0 |
| 2 | 0.056715468 | 0.2923955 | −0.6067898 | 0 | 0 |
| 3 | −0.046354069 | 1.0887971 | −2.6668051 | 3.3613864 | 0 |
| 4 | 0.019152606 | 0.045524465 | 0.0028285403 | 0 | 0 |

| Numerical Embodiment 3 | | | | | |
|---|---|---|---|---|---|
| Surface (i) | Ri (mm) | Ti (mm) | Nd | Vd | Conic |
| 1 | 1.288 | 1 | 1.5435 | 56.8 | −1 |
| 2 | 2.78 | 0.6 | | | −3.790165 |
| 3 | −0.846 | 0.6 | 1.5854 | 30.0 | 0.3034489 |
| 4 | −1.345 | 0.1 | | | −0.7088952 |
| 5 | 4.7 | 1.65 | 1.7725 | 49.6 | 0 |
| 6 | −18.262 | | | | 0 |

Aspheric coefficients for the aspheric surfaces 10, 11, 21 and 20 of the first and second lens elements 1, 2 are:

| Surface (i) | Coef. | | | | |
| --- | --- | --- | --- | --- | --- |
| | A | B | C | D | E |
| 1 | 0.046433642 | 0.12094767 | −0.18172774 | 0.19330845 | −0.068364527 |
| 2 | 0.023807305 | 0.54151907 | −3.3309773 | 8.5279048 | −8.7803566 |
| 3 | 0.21638565 | −0.77983017 | 3.1740411 | −3.3770628 | 0 |
| 4 | 0.023401194 | −0.07603154 | 0.16568863 | −0.11878658 | 0.024528829 |

According to the above numerical data of Numerical Embodiment 3, the ratio of −f2 to f1 is 1.96, nd is 1.7725, vd is 49.6 and the ratio of f3 to f1 is 1.398. The total focal length of the present lens system is 3.78 mm, the maximum image height is 2.3 mm, and the F-number is 2.86. In this Numerical Embodiment 3, the third lens element 3 is formed as a biconvex lens.

Figure 5A:
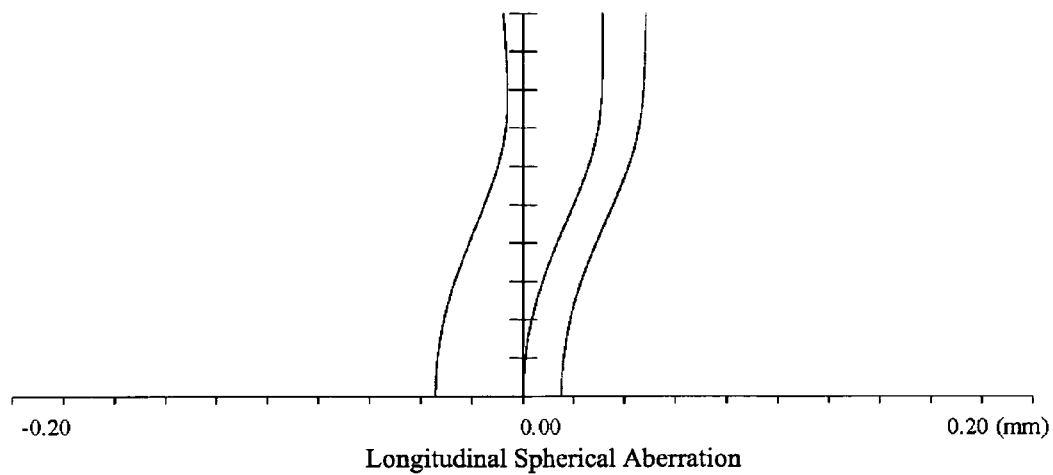
FIGS. 5A-5D respectively show graphs of longitudinal spherical aberration, field curvature, field distortion and transverse ray fan plots of the present compact lens system according to Numerical Embodiment 3.
Figure 5B:
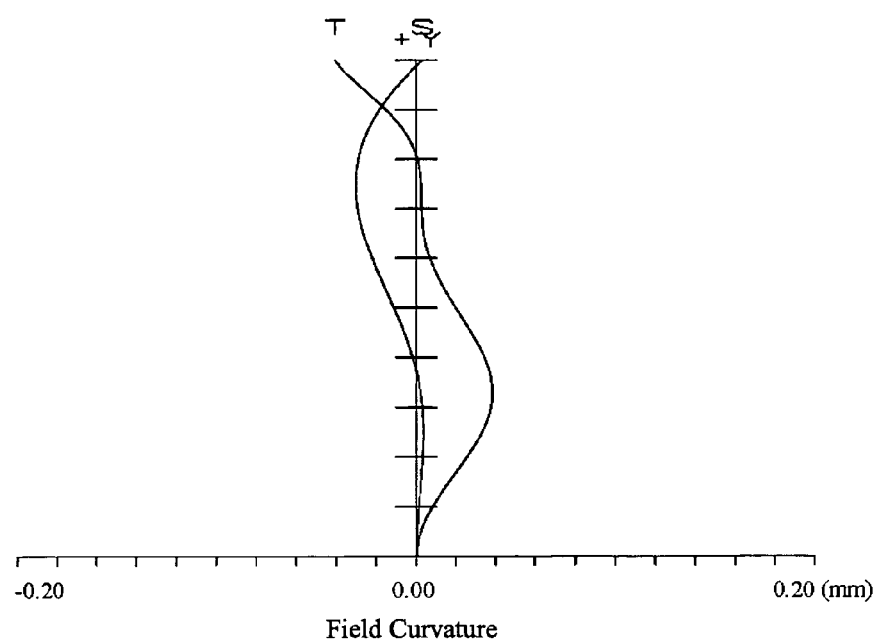
Figure 5C:
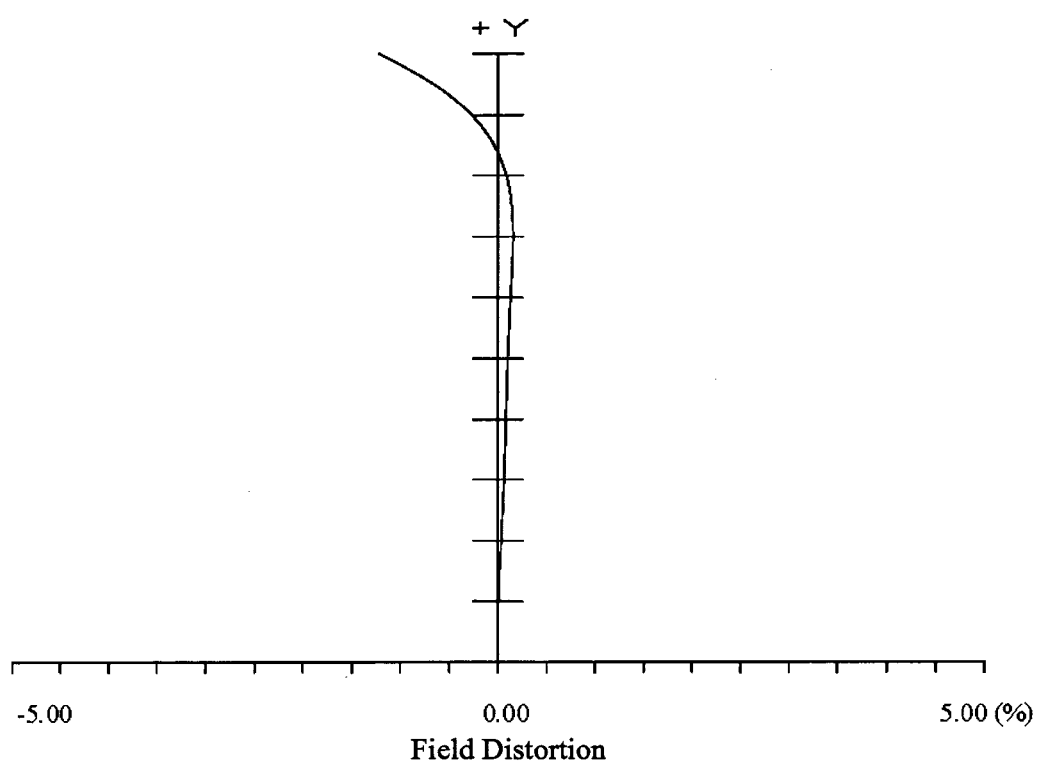
Figure 5D:
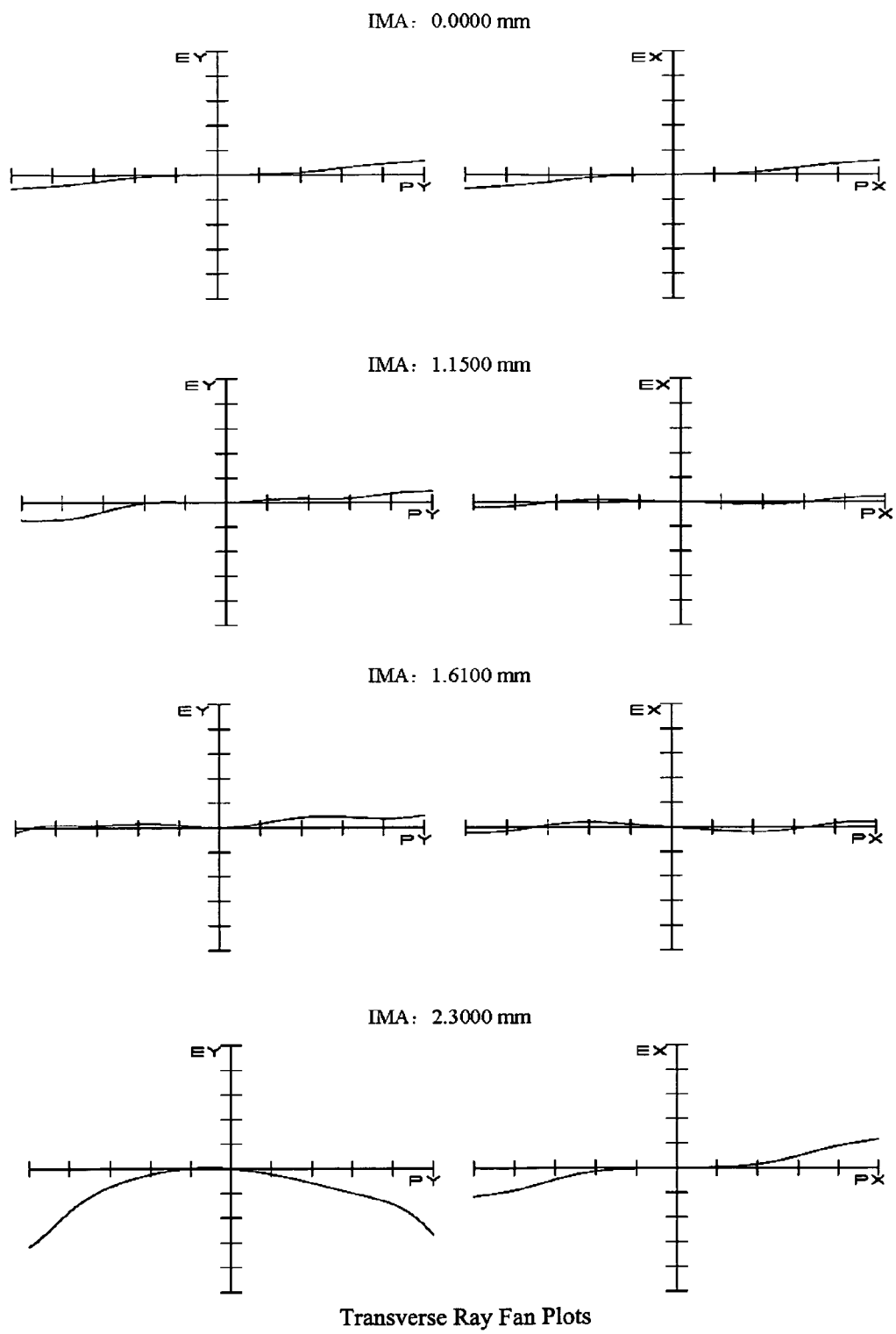

FIGS. 5A-5D respectively show graphs of longitudinal spherical aberration, field curvature, field distortion and transverse ray fan plots of the present compact lens system according to Numerical Embodiment 3. The graph of longitudinal spherical aberration shown in FIG. 5A is obtained in the case of a pupil radius of 0.6759 mm. The three curves in the graph from the left to the right are respectively obtained for the incident light of wavelengths 0.486 μm, 0.588 μm and 0.656 μm. The graphs illustrated in FIGS. 5B-5D are all obtained for the incident light of wavelength 0.588 μm. FIG. 5D illustrates the transverse ray fan plots of the present compact lens system when the image height is 0.000 mm, 1.1500 mm, 1.6100 mm and 2.3000 mm. It can be seen that the present compact lens system of Numerical Embodiment 3 provides effective correction of various aberrations and thus a high level of optical performance is achieved.

According to the concept of the present invention, the present compact lens system is composed of only three lens elements 1, 2 and 3 having a positive-negative-positive optical configuration. Two of the three lens elements are formed as aspheric lenses. Accordingly, the overall length of the present lens system is significantly reduced. The symmetrical arrangement of the first and second lens elements 1, 2 with respect to the aperture stop 4 along the optical axis of the lens system offers well-balanced correction of various aberrations, whereby a high level of optical performance is ensured. Furthermore, the third lens element 3 is disposed behind the second lens element 2 proximate to the image side, which allows the third lens element 3 to have a relatively large aperture, thereby facilitates its high volume manufacturing and thus significantly reduces the production cost. All these factors make the present compact lens system especially suitable for use in compact photographic devices such as compact digital camera and camera phones.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A compact lens system comprising, in succession from an object side to an image side thereof:
    a first lens element having a convex surface facing the object side and an opposite concave surface;
    a second lens element having a concave surface facing the concave surface of the first lens element and an opposite convex surface curved toward the image side; and
    a third lens element disposed adjacent to the image side, the surface of the third lens element facing toward the image side has a radius of curvature larger than that of the other surface facing the convex surface of the second lens element;
    wherein the first, second and third lens elements satisfy the following condition:

$1.5 < -f2/f1 < 3.5$ where, f1 and f2 are the focal lengths of the first and second lens elements, respectively.

2. The compact lens system as claimed in claim 1, wherein the first and second lens elements are meniscus lenses made of plastic.

3. The compact lens system as claimed in claim 1, wherein the first lens element has a positive power, the second lens element has a negative power, and the third lens element has a positive power.

4. The compact lens system as claimed in claim 1, wherein both of the first and second lens elements are aspheric lenses each having at least one aspheric surface.

5. The compact lens system as claimed in claim 1, wherein the third lens element is a biconvex lens or a plano-convex lens made of glass, the refractive index (nd) and the Abbe number (vd) of the third lens element satisfying the following condition:

$1.73 < nd < 1.84$ $42 < vd < 55.$

6. The compact lens system as claimed in claim 1, further comprising an aperture stop disposed between the first and second lens elements.

7. The compact lens system as claimed in claim 1, wherein the first and third lens elements satisfy the following condition:

$1.2 < f3/f1 < 1.8$ where, f1 and f3 are the focal lengths of the first and third lens elements, respectively.

8. A compact lens system comprising, in succession from an object side to an image side thereof, an aspheric first lens element having a positive power, an aperture stop, an aspheric second lens element having a negative power, and a third lens element having a positive power, the first and second lens elements being disposed on opposite sides of the aperture stop in a substantially symmetrical manner, the first, second and third lens elements satisfying the following conditions:

$$1.5 < -f2/f1 < 3.5$$

$$1.2 < f3/f1 < 1.8$$

$$1.73 < nd < 1.84$$

$$42 < vd\ 55$$

where, f1, f2 and f3 are the focal lengths of the first, second and third lens elements, respectively; and nd and vd are the refractive index and the Abbe number of the third lens element, respectively.

9. The compact lens system as claimed in claim 8, wherein both the first and second lens elements are meniscus lenses made of plastic, the first lens element having a convex surface facing the object side and an opposite concave surface facing the aperture stop, the second lens element having a concave surface facing the aperture stop and an opposite convex surface curved toward the third lens element.

10. The compact lens system as claimed in claim 8, wherein the third lens element is a biconvex lens or a piano-convex lens made of glass, the surface of the third lens element facing toward the image side having a radius of curvature larger than that of the other surface facing the second lens element.

* * * * *